United States Patent [19]
Mann

[11] Patent Number: 6,154,857
[45] Date of Patent: Nov. 28, 2000

[54] MICROPROCESSOR-BASED DEVICE INCORPORATING A CACHE FOR CAPTURING SOFTWARE PERFORMANCE PROFILING DATA

[75] Inventor: Daniel Peter Mann, Austin, Tex.

[73] Assignee: Advanced Micro Devices, Inc., Sunnyvale, Calif.

[21] Appl. No.: 08/992,610

[22] Filed: Dec. 17, 1997

Related U.S. Application Data

[60] Provisional application No. 60/043,070, Apr. 8, 1997.

[51] Int. Cl.[7] ............................. H02H 3/05; G01R 31/28
[52] U.S. Cl. ............................... 714/30; 714/38; 714/47
[58] Field of Search ........................... 714/30, 34, 35–39, 714/47; 712/227

[56] References Cited

U.S. PATENT DOCUMENTS

| | | | |
|---|---|---|---|
| 3,707,725 | 12/1972 | Delheim | 444/1 |
| 5,058,114 | 10/1991 | Kuboki et al. | |
| 5,371,689 | 12/1994 | Tatsuma | |
| 5,537,541 | 7/1996 | Wibecan | 395/183.21 |
| 5,590,354 | 12/1996 | Klapproth et al. | 395/800 |
| 5,724,505 | 3/1998 | Argade et al. | 395/183.21 |
| 5,774,724 | 6/1998 | Heisch | 395/704 |
| 5,898,873 | 4/1999 | Lehr | 395/704 |

FOREIGN PATENT DOCUMENTS

| | | |
|---|---|---|
| 0316609 A2 | 5/1989 | European Pat. Off. |
| 0316609 A3 | 5/1989 | European Pat. Off. |
| 0636976 A1 | 2/1995 | European Pat. Off. |
| 0762276 A1 | 3/1997 | European Pat. Off. |
| 0849670 A1 | 6/1998 | European Pat. Off. |
| 59-194245 | 11/1984 | Japan |

OTHER PUBLICATIONS

Kruse, Data Structures and Program Design, Prentice–Hall, 1987, pp. 71–79.
*Pentium Processor's User Manual, Vol. 3: Architecture and Programming Manual*, by Intel Corporation, pp. 17–1 through 17–9, 1994.
*Embedded System Engineering Show Catalogue*, by Motorola, pp. 52–54, Apr./May 1997.
*MEVB Quick Start Guide*, by Motorola, pp. 3–5 and 7–2 (admitted prior to Dec. 17, 1997).
*Choosing a Cross–Debugging Methodology*, Embedded Systems Programming, Aug. 1997.
*CPU32 Reference Manual*, by Motorola, pp. 7–1 through 7–13 (admitted prior to Dec. 17, 1997).

(List continued on next page.)

*Primary Examiner*—John A. Follansbee
*Attorney, Agent, or Firm*—Akin, Gump, Strauss, Hauer & Feld, LLP

[57] ABSTRACT

A processor-based device incorporating an on-chip trace cache and supporting circuitry for providing software performance profiling information. A trigger control register is configured to initialize and trigger (start) a first on-chip counter upon entry into a selected procedure. A second trigger control register is used to stop the first counter when the procedure prologue of the selected procedure is entered. Counter values reflecting the lapsed execution time of the selected procedure are then stored in the on-chip trace cache. Similar techniques can be used to measure other parameters such as interrupt handler execution times. In the disclosed embodiment of the invention, a second counter is also provided. The second counter runs continually, but is reset to zero following a stop trigger event caused by the second trigger control register. The stop trigger event also causes the value of the second counter to be placed in the on-chip trace cache. This second counter value is useful for obtaining the frequency of occurrence of a procedure of interest, whereas the first counter provides information about the procedure's execution time. Either post-processing software executing on a target system, a host system utilizing a debug port, or off-chip trace capture hardware can be used to analyze the profile data. Both serial and parallel communication channels are provided for communicating the trace information to external devices. The processor-based device thereby provides a flexible, high-performance solution for furnishing software performance profiling information.

21 Claims, 8 Drawing Sheets

OTHER PUBLICATIONS

*K5 HDT*, e-mail describing K5 HDT, Jan. 11, 1997.

*Vanishing Visibility, Part 2*, Embedded Systems Programming, Aug. 1997, pp. 113 through 115.

*Debugging with Real–Time Trace*, Embedded Systems Programming, Aug. 1997, pp. 50 through 58.

*Advanced On–chip Debug for ColdFire Developers*, Embedded Systems Programming, Apr./May 1997, pp. 52 through 54.

IBM Corporation, "Tailorable Embedded Event Trace", Dec. 1991, pp. 259–261, IBM Technical Disclosure Bulletin, vol. 34, No. 7B, XP000282573.

Geoff Revill, "Advanced On–chip Debug for ColdFire Developers", Embedded System Engineering, Apr./May 1997, pp. 52–54.

FIG. 7A

| 20 | | | | 15 | | | | | | | | | | | | | | | | 0 |
|---|---|---|---|---|---|---|---|---|---|---|---|---|---|---|---|---|---|---|---|---|
| 0 | 0 | 0 | 1 | B3 | B2 | B1 | 1 | 0 | 0 | 0 | 0 | 0 | 0 | 0 | 0 | 0 | 0 | 0 | 0 | 0 |
| | TCODE=1 | | | | | | | Only 3-bits of BFIELD used | | | | | | | | | | | | |

FIG. 7B

| 20 | 19 | 15 | 0 |
|---|---|---|---|
| 0 | TCODE=2 | TADDR.H, high 16-bits of EIP target logical address | |
| 0 | TCODE=7 | TADDR.L, low 16-bits of EIP target logical address | |

FIG. 7C

| 20 | 19 | 15 | | | | 0 |
|---|---|---|---|---|---|---|
| 0 | TCODE=8 | TADDR.H, high 16-bits of EIP stop instruction logical address | | | | |
| 0 | TCODE=7 | TADDR.L, low 16-bits of EIP stop instruction logical address | | | | |
| 0 | TCODE=4 | BADDR.H, high 16-bits of current segment base address | | | | |
| 0 | TCODE=7 | BADDR.L, low 15-4 bits of segment base address | − | PG | SZ | R̄/P |

FIG. 7D

| 20 | 19 | 15 | | | | 0 |
|---|---|---|---|---|---|---|
| V̄ | TCODE=1 | 1 | BFIELD | | | |
| 0 | TCODE=6 | TADDR.H, high 16-bits of EIP interrupted instruction logical address | | | | |
| 0 | TCODE=7 | TADDR.L, low 16-bits of EIP interrupted instruction logical address | | | | |
| 0 | TCODE=3 | BADDR.H, high 16-bits of previous segment base address | | | | |
| 0 | TCODE=7 | BADDR.L, low 15-4 bits of segment base address | − | PG | SZ | R̄/P |
| 0 | TCODE=5 | Vector Number | | | | |
| 0 | TCODE=7 | TADDR.H, high 16-bits of interrupt handler logical address | | | | |
| 0 | TCODE=7 | TADDR.L, low 16-bits of instruction logical address | | | | |

| 20 | 19 | 15 | | 0 |
|---|---|---|---|---|
| V̄ | TCODE-1 | 1 | BFIELD | |
| 0 | TCODE-3 | BADDR.H, high 16-bits of previous segment base address | | |
| 0 | TCODE-7 | BADDR.L, low 15-4 bits of segment base address | – \| PG \| SZ \| R̄/P | |
| 0 | TCODE-2 | TADDR.H, high 16-bits of long-jump target logical address | | |
| 0 | TCODE-7 | TADDR.L, low 16-bits of long-jump target logical address | | |

*FIG. 7E*

| 20 | 19 | 15 | 0 |
|---|---|---|---|
| 0 | TCODE-9 | 16-bit value supplied by instruction | |

*FIG. 7F*

| 20 | 19 | 15 | 0 |
|---|---|---|---|
| 0 | TCODE-6 | TADDR.H, high 16-bits of EIP for current instruction logical address | |
| 0 | TCODE-7 | TADDR.L, low 16-bits of EIP for current instruction logical address | |

*FIG. 7G*

MICROPROCESSOR-BASED DEVICE INCORPORATING A CACHE FOR CAPTURING SOFTWARE PERFORMANCE PROFILING DATA

RELATED APPLICATION

This application claims priority to United States application Ser. No. 60/043,070, filed Apr. 8, 1997, which is hereby incorporated by reference as if set forth in its entirety.

BACKGROUND OF THE INVENTION

1. Field of the Invention

The invention relates to software performance profiling support in microprocessors, and more particularly to a microprocessor-based device incorporating an on-chip trace cache capable of capturing software performance profile data.

2. Description of the Related Art

Software performance profiling refers to examining the execution times, frequencies and calling patterns of different software procedures within a software program. Performance profiling can be a very useful tool to a software engineer attempting to optimize the execution times of software applications. Various techniques for performing software profiling are currently used, including many base don statistical analysis. When performing software profiling, execution times and subroutine call linkage are sometimes captured by external (off-chip) instrumentation that monitors the system buses of the computer system which is executing the software. Alternatively, software can be "instrumented" or modified to provide profiling information directly to the computer system on which the software is executed.

The growth in software complexity, coupled with increasing processor clock speeds, has placed new burdens on application software developers and complicated the task of performance profiling. The costs associated with developing, debugging and optimizing new software products is now a significant factor in processor selection. Processor features that adequately facilitate software debug, including performance profiling, result in shorter customer development times and increase the processor's attractiveness for use within industry. The need to provide software debug support is particularly acute within the embedded products industry, where specialized on-chip circuitry is often combined with a processor core.

Logic analyzers, read-only memory (ROM) emulators and in-circuit emulators (ICE) are frequently employed to capture software performance profiling data. In-circuit emulators provide certain advantages over other debug environments, offering complete control and visibility over memory and register contents, as well as overlay and trace memory in case system memory is insufficient. However, use of traditional in-circuit emulators, which involves interfacing a custom emulator back-end with a processor socket to allow communication between emulation equipment and the target system, is becoming increasingly difficult and expensive in today's age of exotic packages and shrinking product life cycles.

In another approach (the "Background Debug Mode" by Motorola, Inc.), limited on-chip debug circuitry is provided for basic run control. Through a dedicated serial link requiring additional pins, this approach allows a debugger/performance profiler to start and stop the target system and apply basic code breakpoints by inserting special instructions in system memory. Breakpoint registers are used to generate off-chip trigger pulses that function to start and stop timers. The serial link, however, does not provide on-chip software performance profiling capture capabilities—additional dedicated pins and external trace capture hardware are required to provide profile data.

As mentioned, software itself is sometimes instrumented so that it can be analyzed to collect performance profiling data. Instrumented code is often generated by a compiler configured to insert profiling information in order to analyze selected procedures. For example, on procedure call prologues and exit epilogues, the compiler may insert code used to activate counters that track execution times. As a specified program run call is executed, a jump to an inserted routine is performed to mark a counter/timer. The execution time of a parent procedure that calls other, ancillary procedures can be determined by subtracting the execution time(s) of the ancillary procedures from the total execution time of the parent procedure. By analyzing all of the procedures of a module, the total execution time of the module can be calculated. Of course, the execution time of a given procedure may vary depending on the state of variables within the procedure, requiring statistical sampling to be utilized.

Thus, many current solutions for software performance profiling have a variety of hardware and software limitations, including: the need to instrument code, increased packaging and development costs, circuit complexity, and bandwidth matching difficulties. A low-cost procedure for capturing profile data would be greatly desirable, especially because the limitations of the existing solutions are likely to be exacerbated in the future as internal processor clock frequencies continue to increase.

SUMMARY OF THE INVENTION

Briefly, a processor-based device according to the present invention includes an on-chip trace cache and supporting circuitry for providing software performance profiling information. The trace cache gathers information concerning the execution time spent in selected procedures. Performance profiling information is thereby gathered without instrumenting code, negatively impacting program execution speeds, or using expensive off-chip support equipment.

In a system according to the present invention, a breakpoint or trigger control register is configured to initialize and trigger (start) a first on-chip counter upon entry into a selected procedure. A second breakpoint or trigger control register is used to stop the first counter when the procedure prologue of the selected procedure is entered. Counter values reflecting the lapsed execution time of the selected procedure are then stored in the on-chip trace cache. Similar techniques can be used to measure other parameters such as interrupt handler execution times.

In the disclosed embodiment of the invention, a second counter is also provided. The second counter runs continually, but is reset to zero following a stop trigger event caused by the second trigger control register. The stop trigger event also causes the value of the second counter to be placed in the on-chip trace cache. This second counter value is useful for obtaining the frequency of occurrence of a procedure of interest, whereas the first counter provides information about the procedure's execution time.

The profile data can be analyzed by post-processing software resident in the computer system in which the selected procedures are executed, by a host system utilizing a debug port, or via off-chip trace capture hardware. Generally, only one procedure is profiled at a time. By examining the trace cache, the minimum, average, and maximum times spent in a procedure, as well as other statistical data, can be determined. One beneficial aspect of the invention is that the procedure prologue and epilogue are not required to be modified. However, a compiler can still be utilized to add profiling information for use with the present invention.

Both serial and parallel communication channels are provided for communicating the trace information to external devices. In the disclosed embodiment of the invention controllability and observability of the profile (or trace) cache are achieved through a software debug port that uses an IEEE-1149.1-1990 compliant JTAG (Joint Test Action Group) interface or a similar standardized interface that is integrated into the processor-based device.

Thus, a processor-based device supplying a flexible, high-performance solution for furnishing software performance profiling information is provided. The disclosed on-chip trace cache also alleviates various of the bandwidth and clock synchronization problems that arise in many existing solutions.

BRIEF DESCRIPTION OF THE DRAWINGS

A better understanding of the present invention can be obtained when the following detailed description of the preferred embodiment is considered in conjunction with the following drawings, in which:

FIG. 7A–7G illustrate the general format of a variety of optional trace cache entries for reporting instruction execution information.

DETAILED DESCRIPTION OF THE PREFERRED EMBODIMENT

Figure 1:
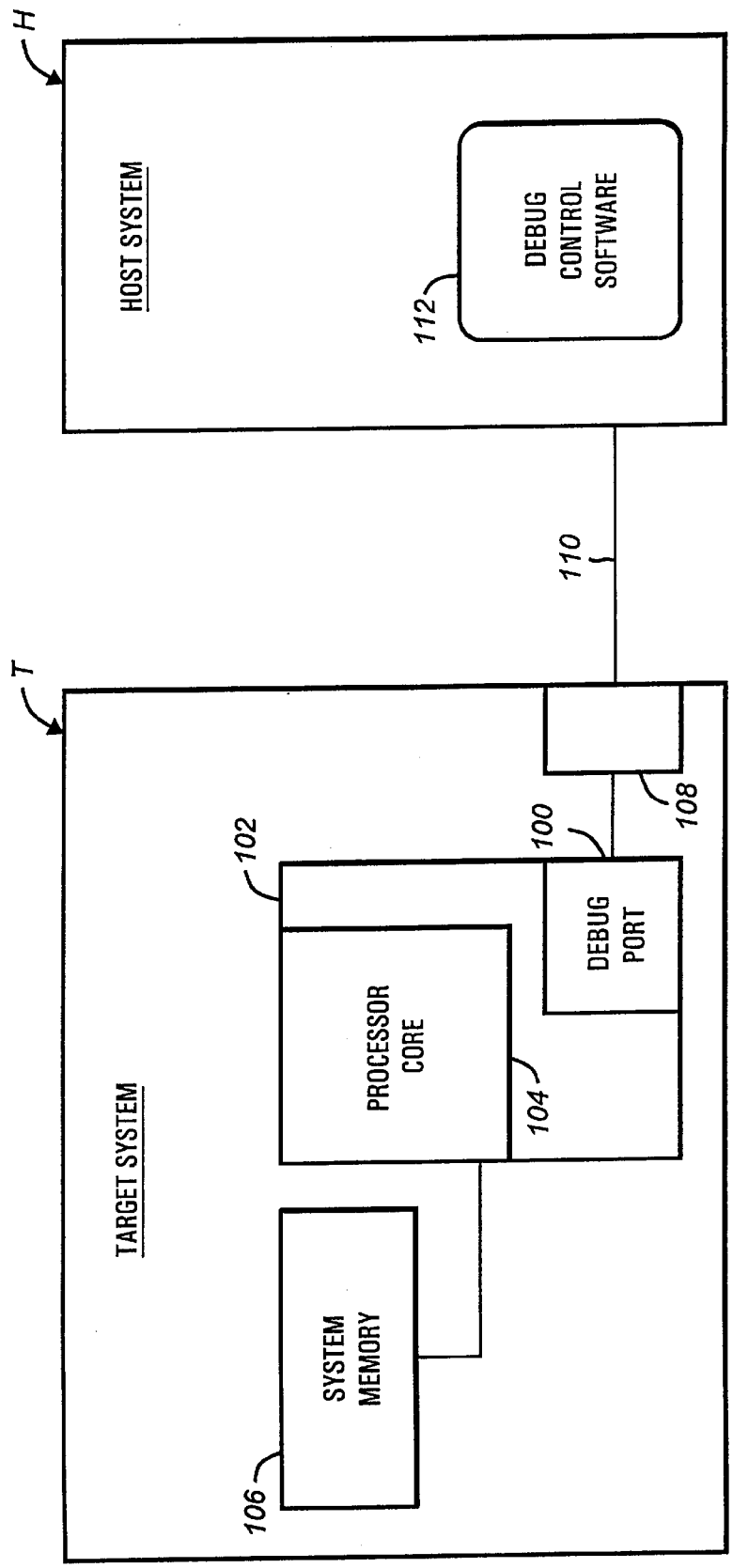
FIG. 1 is a block diagram of a software debug environment utilizing a software profiling and debug solution in accordance with the present invention.

Turning now to the drawings, FIG. 1 depicts an exemplary software debug environment illustrating a contemplated use of the present invention. A target system T is shown containing an embedded processor device 102 according to the present invention coupled to system memory 106. The embedded processor device 102 incorporates a processor core 104, a trace cache 200 (FIG. 2), and a debug port 100. Although not considered critical to the invention, the embedded processor device 102 may incorporate additional circuitry (not shown) for performing application specific functions, or may take the form of a stand-alone processor or digital signal processor. Preferably, the debug port 100 uses an IEE-1149.1-1990 compliant JTAG interface or other similar standardized serial port interface.

A host system H is used to execute debug control software 112 for transferring high-level commands and controlling the extraction and analysis of software performance profiling information generated by the target system T. The host system H and target system T of the disclosed embodiment of the invention communicate via a serial link 110. Most computers are equipped with a serial or parallel interface which can be inexpensively connected to the debug port 100 by means of a serial connector 108, allowing a variety of computers to function as a host system H. Alternatively, the serial connector 108 could be replaced with higher speed JTAG-to-network conversion equipment. Further, the target system T can be configured to internally analyze software performance profile data.

Figure 2:
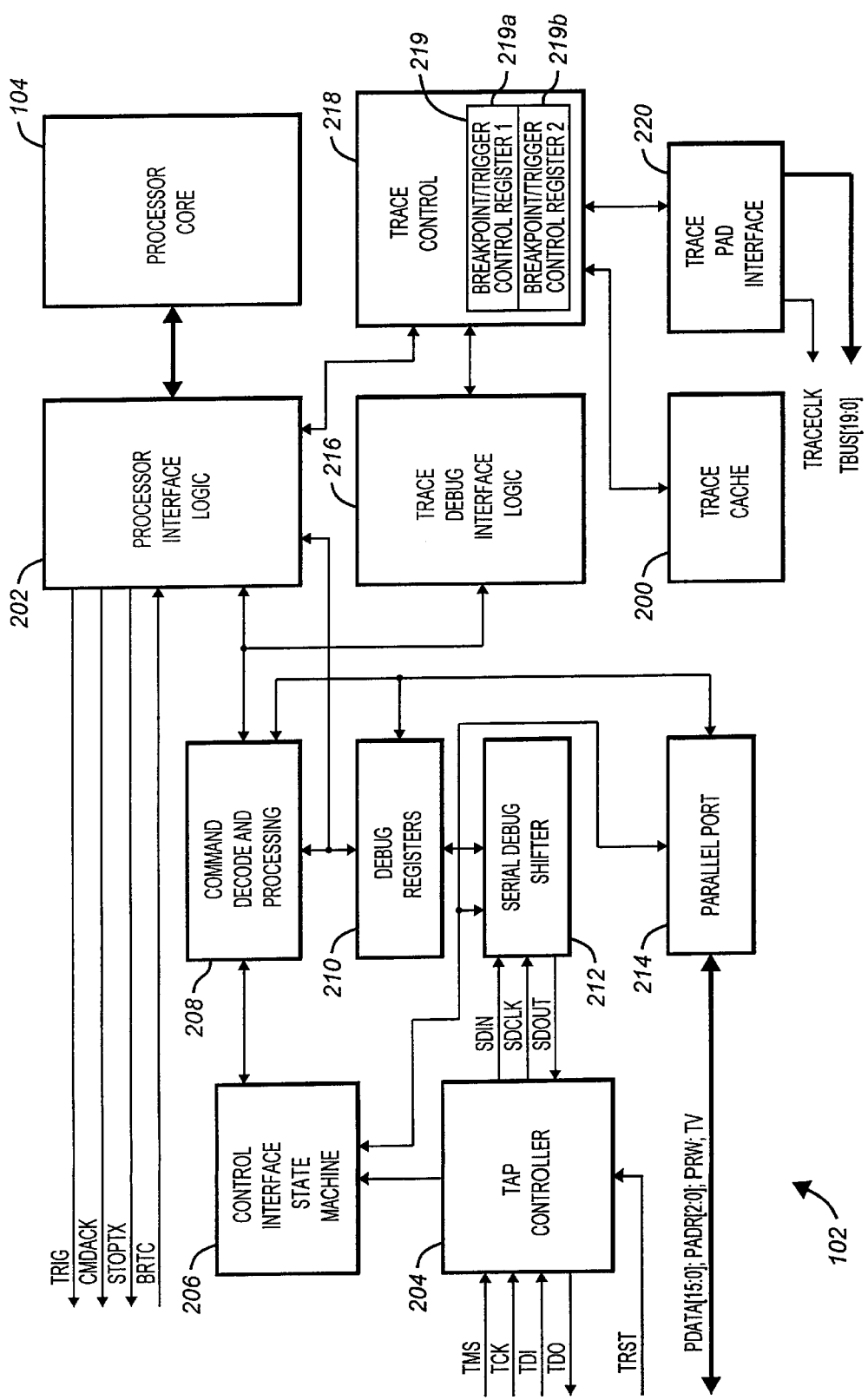
FIG. 2 is a block diagram providing details of an exemplary embedded processor product incorporating an on-chip trace cache according to the present invention.

Referring now to FIG. 2, details of the embedded processor device 102 according to the present invention are provided. In addition to a processor core 104, FIG. 2 depicts various elements of an enhanced embodiment of the debug port 100 capable of utilizing and controlling.

Trace cache 200. Many other configurations are possible, as will become apparent to those skilled in the art, and the various processor device 102 components described below are shown for purposes of illustrating the benefits associated with providing the on-chip trace cache 200.

The Trace control circuitry 218 and the trace cache 200 of the disclosed embodiment of the invention can also cooperate to capture software performance profiling information. In addition, the trace control circuitry 218 supports "tracing" to a trace pad interface port 200 or to the trace cache 200 and provides user control for selectively activating capture of software performance profiling data. Other features enabled by the trace control circuitry 218 include programmability of synchronization address generation and user specified trace records, as discussed in greater detail below.

At a minimum, only the conventional JTAG pins need be supported in the software debug port 100 in the described embodiment of the invention. The JTAG pins essentially become a transportation mechanism, using existing pins, to enter profiling and other commands to be performed by the processor core 104. More specifically, the test clock signal TCK, the test mode select signal TMS, the test data input signal TDI and the test data output signal TDO provided to and driven by a JTAG Test Access Port (TAP) controller 204 are conventional JTAG support signals and known to those skilled in the art. As discussed in more detail below, an "enhanced" embodiment of the debug port 100 adds the command acknowledge signal CMDACK, the break request/trace capture signal BRTC, the stop transmit signal STOPTX, and the trigger signal TRIG to the standard JTAG interface. The additional signals allow for pinpoint accuracy of external breakpoint assertion and monitoring, triggering of external devices in response to internal breakpoints, and elimination of status polling of the JTAG serial interface. These "sideband" signals offer extra functionality and improve communications speeds for the debug port 100. These signals also aid in the operation of an optional parallel port 214 provided on special bond-out versions of the disclosed embedded processor device 102.

The JTAG TAP controller 204 accepts standard JTAG serial data and control via the conventional JTAG signals. When a DEBUG instruction has been written to the JTAG instruction register, a serial debug shifter 212 is connected to the JTAG test data input signal TDI and test data output signal TDO, such that commands and data can then be loaded into and read from debug registers 210. In the disclosed embodiment of the invention, the debug registers 210 include two debug registers for transmitting (TX_DATA register) and receiving (RX_DATA register) data, an instruction trace configuration register (ITCR), and a debug control status register (DCSR).

A control interface state machine 206 coordinates the loading/reading of data to/from the serial debug shifter 212 and the debug registers 210. A command decode and processing block 208 decodes commands/data and dispatches them to processor interface logic 202 and trace debug interface logic 216. In addition to performing other functions, the trace debug interface logic 216 and trace control logic 218 coordinate the communication of software performance profiling and other trace information from the trace cache 200 to the TAP controller 204. The processor interface logic 202 communicates directly with the processor core 104, as well as the trace control logic 218. As described more fully below, parallel port logic 214 communicates with a control interface state machine 206 and the debug registers 210 to perform parallel data read/write operations in optional bond-out versions of the embedded processor device 102.

Before software performance profiling information is communicated via the debug port 100 (using only conventional JTAG signals), the port 100 is enabled by writing the public JTAG instruction DEBUG into a JTAG instruction register contained within the TAP controller 204. As shown below, the JTAG instruction register of the disclosed embodiment is a 38-bit register comprising a 32-bit data field (debug_data[31:0]), a four-bit command field to point to various internal registers and functions provided by the debug port 100, a command pending flag, and a command finished flag. It is possible for some commands to use bits from the debug_data field as a sub-field to extend the number of available commands.

| 37 | 5 | 1 | 0 |
|---|---|---|---|
| debug_data | command | P | F |

JTAG Instruction Register

This JTAG instruction register is selected by toggling the test mode select signal TMS. The test mode select signal TMS allows the JTAG path of clocking to be changed in the scan path, enabling multiple paths of varying lengths to be used. Preferably, the JTAG instruction register is accessible via a short path. This register is configured to include a "soft" register for holding values to be loaded into or received from specified system registers.

Figure 3:
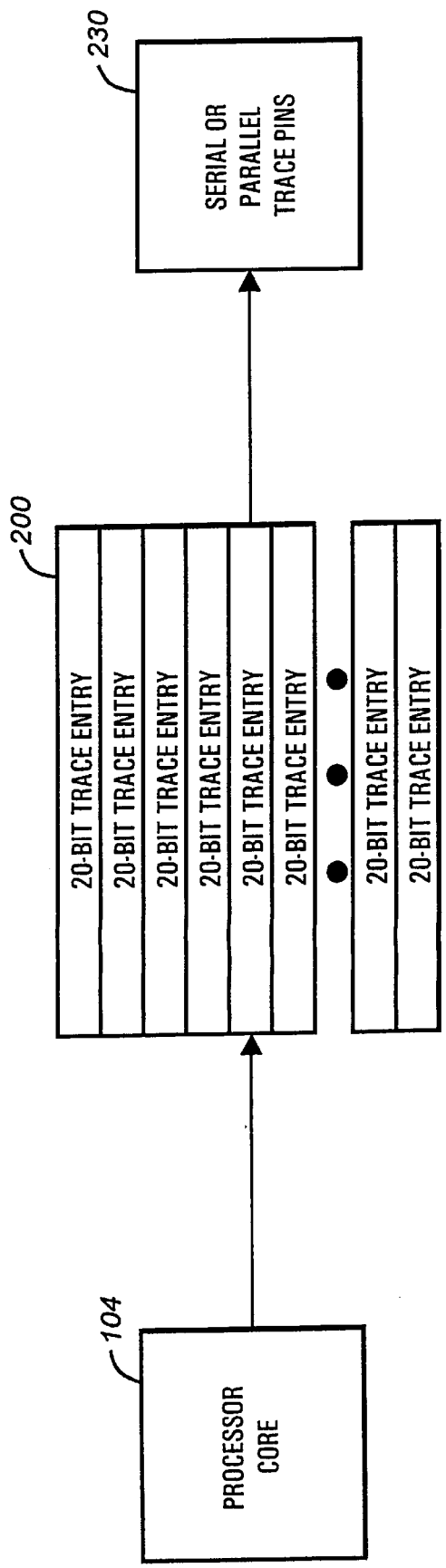
FIG. 3 is a simplified block diagram depicting the relationship between an exemplary trace cache and other components of an embedded processor product according to the present invention.

Referring now to FIG. 3, a simplified block diagram depicting the relationship between the exemplary trace cache 200 and other components of the embedded processor device 102 according to the present invention is shown. In one contemplated embodiment of the invention, the trace cache 200 is a 128 entry first-in, first-out (FIFO) circular cache. Increasing the size of the trace cache 200 increases the amount of software performance profile and other instruction trace information that can be captured, although the amount of required silicon area may increase.

As described in more detail below, the trace cache 200 of the disclosed embodiment of the invention stores a plurality of 20-bit (or more) trace entries, such as software performance profiling and other trace information. Additional information, such as task identifiers and trace capture stop/start information, can also be placed in the trace cache 200. The contents of the trace cache 200 are provided to external hardware, such as the host system H, via either serial or parallel trace pins 230. Alternatively, the target system T can be configured to examine the contents of the trace cache 200 internally.

Figure 4:
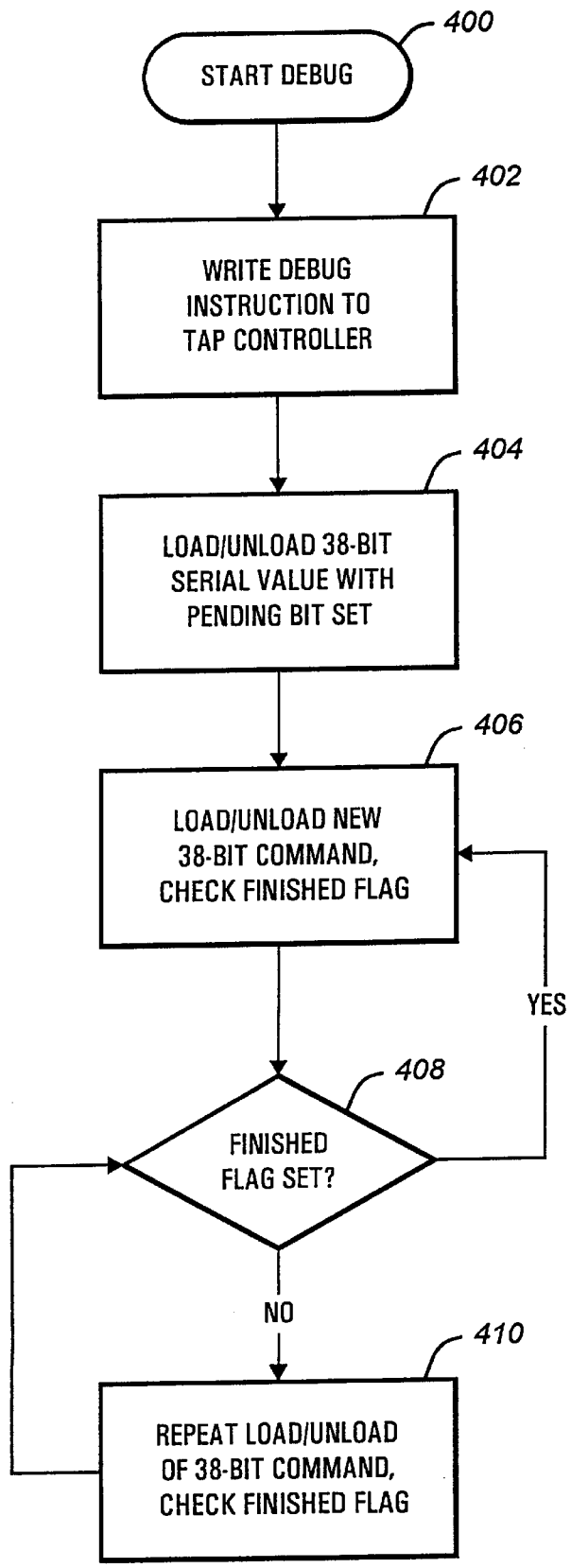
FIG. 4 is a flowchart illustrating software debug command passing according to one embodiment of the invention.

FIG. 4 provides a high-level flow chart of command passing when using a standard JTAG interface. Upon entering debug mode in step 400, the DEBUG instruction is written to the TAP controller 204 in step 402. Next, in step 404, the 38-bit serial value is shifted in as a whole, with the command pending flag set and desired data (if applicable, otherwise zero) in the data field. Control proceeds to step 406 where the pending command is loaded/unloaded and the command finished flag checked. Completion of a command typically involves transferring a value between a data register and a processor register or memory/IO location. After the command has been completed, the processor 104 clears the command pending flag and sets the command finished flag, at the same time storing a value in the data field if applicable. The entire 38-bit register is scanned to monitor the command finished and command pending flags. If the pending flag is reset to zero and the finished flag is set to one, the previous command has finished. The status of the flags is captured by the control interface state machine 206. A slave copy of the flags status is saved internally to determine if the next instruction should be loaded. The slave copy is maintained due to the possibility of a change in flag status between TAP controller 204 states. This allows the processor 104 to determine if the previous instruction has finished before loading the next instruction.

If the finished flag is not set as determined in step 408, control proceeds to step 410 and the loading/unloading of the 38-bit command is repeated. The command finished flag is also checked. Control then returns to step 408. If the finished flag is set as determined in step 408, control returns to step 406 for processing of the next command. DEBUG mode is exited via a typical JTAG process.

Returning to FIG. 2, the aforementioned optional sideband signals are utilized in the enhanced debug port 100 to provide extra functionality. The optional sideband signals include a break request/trace capture signal BRTC that can function as a break request signal or a trace capture enable signal depending on the status of a bit set in the debug control/status register. If the break request/trace capture signal BRTC is set to function as a break request signal, it is asserted to cause the processor 104 to enter debug mode (the processor 104 can also be stopped by scanning in a halt command via the convention JTAG signals). If set to function as a trace capture enable signal, asserting the break request/trace capture signal BRTC enables capturing of trace information. Deasserting the signal turns trace capture off. The signal takes effect on the next instruction boundary after it is detected and is synchronized with the internal processor clock. The break request/trace capture signal BRTC may be asserted at any time.

The trigger signal TRIG is configured to pulse whenever an internal processor breakpoint has been asserted. The trigger signal TRIG may be used to trigger an external capturing device such as a logic analyzer, and is synchronized with the trace record capture clock signal TRACECLK. When a breakpoint is generated, the event is synchronized with the trace capture clock signal TRACECLK, after which the trigger signal TRIG is held active for the duration of trace capture.

The stop transmit signal STOPTX is asserted when the processor 104 has entered DEBUG mode and is ready for register interrogation/modification, memory or I/O reads and writes through the debug port 100. In the disclosed embodiment of the invention, the stop transmit signal STOPTX reflects the state of a bit in the debug control status register (DCSR). The stop transmit signal STOPTX is synchronous with the trace capture clock signal TRACECLK.

Figure 5:
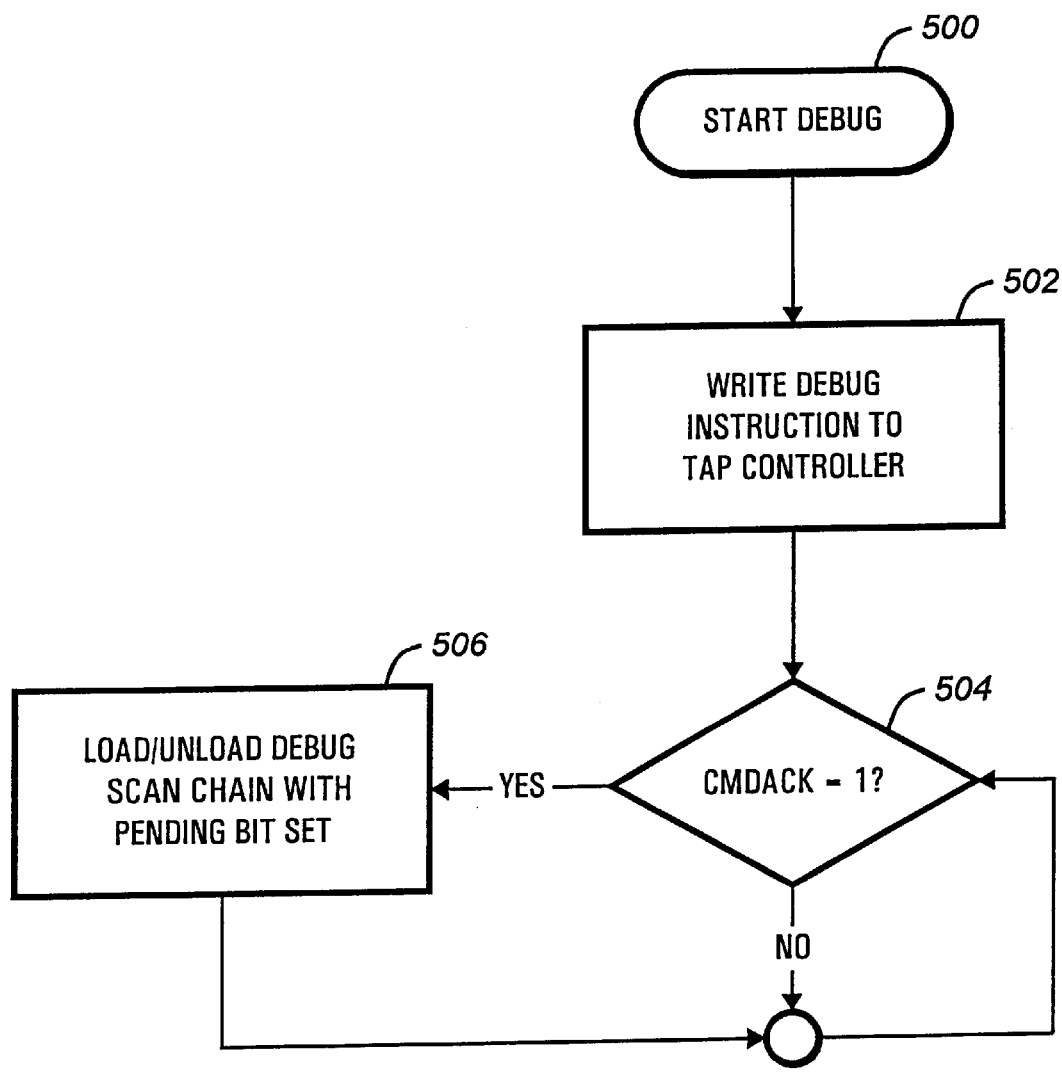
FIG. 5 is a flowchart illustrating enhanced command passing according to a second embodiment of the invention.

The command acknowledge signal CMDACK is described in conjunction with FIG. 5, which shows simplified command passing in the enhanced debug port 100 of FIG. 2. Again, to place the target system T into DEBUG mode, a DEBUG instruction is written to the TAP controller 204 in step 502. Control proceeds to step 504 and the command acknowledge signal CMDACK is monitored by the host system H to determine command completion status. This signal is asserted high by the target system T simultaneously with the command finished flag and remains high until the next shift cycle begins. When using the command acknowledge signal CMDACK, it is not necessary to shift out the JTAG instruction register to capture the command finished flag status. The command acknowledge signal CMDACK transitions high on the next rising edge of the test clock signal TCK after the command finished flag has changed from zero to one. When using the enhanced JTAG signals, a new shift sequence (step 506) is not started by the host system H until the command acknowledge signal CMDACK pin has been asserted high. The command acknowledge signal CMDACK is synchronous with the test clock signal TCK. The test clock signal TCK need not be clocked at all times, but is ideally clocked continuously when waiting for a command acknowledge signal CMDACK response.

OPERATING SYSTEM/APPLICATION COMMUNICATION VIA THE DEBUG PORT 100

Also included in debug register block 210 is an instruction trace configuration register (ITCR). This 32-bit register provides for the enabling/disabling and configuration of software performance profile and instruction trace debug functions. Numerous such functions are contemplated, including various levels of tracing, trace synchronization force counts, trace initialization, instruction tracing modes, clock divider ratio information, as well as additional functions shown in the following table. The ITCR is accessed through a JTAG instruction register write/read command as is the case with the other registers of the debug register block 210, or via a reserved instruction.

| BIT | SYMBOL | DESCRIPTION/FUNCTION |
|---|---|---|
| 31:30 | Reserved | Reserved |
| 29 | RXINTEN | Enables interrupt when RX bit is set |
| 28 | TXINTEN | Enables interrupt when TX bit is set |
| 27 | TX | Indicates that the target system T is ready to transmit data to the host system H and the data is available in the TX_DATA register |
| 26 | RX | Indicates that data has been received from the host and placed in the RX_DATA register |
| 25 | DISL1TR | Disables level 1 tracing |
| 24 | DISL0TR | Disables level 0 tracing |
| 23 | DISCSB | Disables current segment base trace record |
| 22:16 | TSYNC[6:0] | Sets the maximum number of Branch Sequence trace records that may be output by the trace control block 218 before a synchronizing address record is forced |
| 15 | TSR3 | Sets or clears trace mode on DR3 trap |
| 14 | TSR2 | Sets or clears trace mode on DR2 trap |
| 13 | TSR1 | Sets or clears trace mode on DR1 trap |
| 12 | TSR0 | Sets or clears trace mode on DR0 trap |
| 11 | TRACE3 | Enables Trace mode toggling using DR3 |
| 10 | TRACE2 | Enables Trace mode toggling using DR2 |
| 9 | TRACE1 | Enables Trace mode toggling using DR1 |
| 8 | TRACE0 | Enables Trace mode toggling using DR0 |
| 7 | TRON | Trace on/off |
| 6:4 | TCLK[2:0] | Encoded divider ratio between internal processor clock and TRACECLK |
| 3 | ITM | Sets internal or external (bond-out) instruction tracing mode |
| 2 | TINIT | Trace initialization |
| 1 | TRIGEN | Enables pulsing of external trigger signal TRIG following receipt of any legacy debug breakpoint; independent of the Debug Trap Enable function in the DCSR |
| 0 | GTEN | Global enable for instruction tracing through the internal trace buffer or via the external (bond-out) interface |

Instruction Trace Configuration Register (ITCR)

Another debug register, the debug control/status register (DCSR), provides an indication of when the processor 104 has entered debug mode and allows the processor 104 to be forced into DEBUG mode through the enhanced JTAG interface. As shown in the following table, the DCSR also enables miscellaneous control features, such as: forcing a ready signal to the processor 104, controlling memory access space for accesses initiated through the debug port, disabling cache flush on entry to the DEBUG mode, the TX and RX bits, the parallel port 214 enable, forced breaks, forced global reset, and other functions. The ordering or presence of the various bits in either the ITCR or DCSR is not considered critical to the operation of the invention.

| BIT | SYMBOL | DESCRIPTION/FUNCTION |
|---|---|---|
| 31:12 | Reserved | Reserved |
| 11 | TX | Indicates that the target system T is ready to transmit data to the host system H and the data is available in the TX_DATA register |
| 10 | RX | Indicates that data has been received from the host and placed in the RX_DATA register |
| 9 | DISFLUSH | Disables cache flush on entry to DEBUG mode |
| 8 | SMMSP | Controls memory access space (normal memory space/system management mode memory) for accesses initiated through the Debug Port 100 |
| 7 | STOP | Indicates whether the processor 104 is in DEBUG mode (equivalent to stop transmit signal STOPTX |
| 6 | FRCRDY | Forces the ready signal RDY to the processor 104 to be pulsed for one processor clock; useful when it is apparent that the processor 104 is stalled waiting for a ready signal from a non-responding device |
| 5 | BRKMODE | Selects the function of the break request/trace capture signal BRTC (break request or trace capture on/off) |
| 4 | DBTEN | Enables entry to debug mode or toggle trace mode enable on a trap/fault via processor 104 registers DR0–DR7 or other legacy debug trap/fault mechanisms |
| 3 | PARENB | Enables parallel port 214 |
| 2 | DSPC | Disables stopping of internal processor clocks in the Halt and Stop Grant states |
| 1 | FBRK | Forces processor 104 into DEBUG mode at the next instruction boundary (equivalent to pulsing the external BRTC pin) |
| 0 | FRESET | Forces global reset |

Debug Control/Status Register (DCSR)

When in cross debug environment such as that of FIG. 1, it is desirable for the parent task running on the target system T to send information to the host platform H controlling it. This data may consist, for example, of a character stream from a printf() call or register information from a Task's Control Block (TCB). One contemplated method for transferring the data is for the operating system to place the data in a known region, then via a trap instruction cause DEBUG mode to be entered.

Via debug port 100 commands, the host system H can then determine the reason that DEBUG mode was entered, and respond by retrieving the data from the reserved region. However, while the processor 104 is in DEBUG mode, normal processor execution is stopped. As noted above, this is undesirable for many real-time systems.

This situation is addressed according to the present invention by providing two debug registers in the debug port 100 for transmitting (TX_DATA register) and receiving (RX_DATA register) data. These registers can be accessed using the soft address and JTAG instruction register commands. As noted, after the host system H has written a debug instruction to the JTAG instruction register, the serial debug shifter 212 is coupled to the test data input signal TDI line and test data output signal TDO line.

When the processor 104 executes code causing it to transmit data, it first tests a TX bit in the ITCR. If the TX bit is set to zero then the processor 104 executes a processor instruction (either a memory or I/O write) to transfer the data to the TX_DATA register. The debug port 100 sets the TX bit in the DCSR and ITCR, indicating to the host system H that it is ready to transmit data. Also, the STOPTX pin is set high. After the host system H completes reading the transmit data from the TX_DATA register, the TX bit is set to zero. A TXINTEN bit in the ITCR is then set to generate a signal to interrupt the processor 104. The interrupt is generated only when the TX bit in the ITCR transitions to zero. When the TXINTEN bit is not set, the processor 104 polls the ITCR to determine the status of the TX bit to further transmit data.

When the host system H desires to send data, it first tests a RX bit in the ITCR. IF the RX bit is set to zero, the host system H writes the data to the RX_DATA register and the RX bit is set to one in both the DCSR and ITCR. A RXINT bit is then set in the ITCR to generate a signal to interrupt the processor 104. This interrupt is only generated when the RX in the ITCR transitions to one. When the RXINTEN bit is not set, the processor 104 polls the ITCR to verify the status of the RX bit. If the RX bit is set to one, the processor instruction is executed to read data from the RX_DATA register. After the data is read by the processor 104 from the RX_DATA register the RX bit is set to zero. The host system H continuously reads the ITCR to determine the status of the RX bit to further send data.

This technique enables an operating system or application to communicate with the host system H without stopping processor 104 execution. Communication is conveniently achieved via the debug port 100 with minimal impact to on-chip application resources. In some cases it is necessary to disable system interrupts. This requires that the RX and TX bits be examined by the processor 100. In this situation, the communication link is driven in a polled mode.

PARALLEL INTERFACE TO DEBUG PORT 100

Some embedded systems require instruction trace to be examined while maintaining I/O and data processing operations. Without the use of a multi-tasking operating system, a bond-out version of the embedded processor device 102 is preferable to provide the trace data, as examining the trace cache 200 via the debug port 100 requires the processor 104 to be stopped.

In the disclosed embodiment of the invention, a parallel port 214 is also provided in an optional bond-out version of the embedded processor device 102 to provide parallel command and data access to the debug port 100. This interface provides a 16-bit data path that is multiplexed with the trace pad interface port 220. More specifically, the parallel port 214 provides a 16-bit wide bi-directional data bus (PDATA[15:0]), a 3-bit address bus (PADR[2:9]), a parallel debug port read/write select signal (PRW), a trace valid signal TV and an instruction trace record output clock TRACECLOCK (TC). Although not shared with the trace pad interface port 220, a parallel bus request/grant signal pair PBREQ/PBGNT (not shown) are also provided. The parallel port 214 is enabled by setting a bit in the DCSR. Serial communications via the debug port 100 are not disabled when the parallel port 214 is enabled.

| 22 | 21 | 20 | 19 | 16 | 0 |
|---|---|---|---|---|---|
| TV | TC | PRW | PADR[2:0] | PDATA [15:0] | |

Bond-Out Pins/Parallel Port 214 Format

The parallel port 214 is primarily intended for fast downloads/uploads to and from target system T memory. However, the parallel port 214 may be used for all debug communications with the target system T whenever the processor 104 is stopped. The serial debug signals (standard or enhanced) are used for debug access to the target system T when the processor 104 is executing instructions.

In a similar manner to the JTAG standard, all inputs to the parallel port 214 are sampled on the rising edge of the test clock signal TCK, and all outputs are changed on the falling edge of the test clock signal TCK. In the disclosed embodiment, the parallel port 214 shares pins with the trace pad interface 220, requiring parallel commands to be initiated only while the processor 104 is stopped and the trace pad interface 220 is disconnected from the shared bus.

The parallel bus request signal PBREQ and parallel bus grant signal PBGNT are provided to expedite multiplexing of the shared bus signals between the trace cache 200 and the parallel port 214. When the host interface to the parallel port 214 determines that the parallel bus request signal PBREQ is asserted, it begins driving the parallel port 214 signals and asserts the parallel bus grant signal PBGNT.

When entering or leaving DEBUG mode with the parallel port 214 enabled, the parallel port 214 is used for the processor state save and restore cycles. The parallel bus request signal PBREQ is asserted immediately before the beginning of a save state sequence penultimate to entry of DEBUG mode. On the last restore state cycle, the parallel bus request signal PBREQ is deasserted after latching the write data. The parallel port 214 host interface responds to parallel bus request signal PBREQ deassertion by tri-stating its parallel port drivers and deasserting the parallel bus grant signal PBGNT. The parallel port 214 then enables the debug trace port pin drivers, completes the last restore state cycle, asserts the command acknowledge signal CMDACK, and returns control of the interface to trace control logic 218.

When communicating via the parallel port 214, the address pins PADR[2:0] are used for selection of the field of the JTAG instruction register, which is mapped to the 16-bit data bus PDATA[15:0] as shown in the following table:

| PADR[2:0] | Data Selection |
|---|---|
| 0 0 0 | No selection (null operation) |
| 0 0 1 | 4-bit command register; command driven on PDATA[3:0] |
| 0 1 0 | High 16-bits of debug_data |
| 0 1 1 | Low 16-bits of debug_data |
| 100–111 | Reserved |

It is not necessary to update both halves of the debug_data [31:0] register if only one of the halves is being used (e.g., on 8-bit I/O cycle data writes). the command pending flag is automatically set when performing a write operation to the four-bit command register, and is cleared when the command finished flag is asserted. The host system H can monitor the command acknowledge signal CMDACK to determine when the finished flag has been asserted. Use of the parallel port 214 provides fully visibility of execution history, without requiring throttling of the processor core 104. The trace cache 200, if needed, can be configured for use as a buffer to the parallel port 214 to alleviate any bandwidth matching issues.

OPERATING SYSTEM AND DEBUGGER INTEGRATION

In the disclosed embodiment of the invention, the operation of all debug supporting features, including the trace cache 200, can be controlled through the debug port 100 or via processor instructions. These processor instructions may be from a monitor program, target hosted debugger, or conventional pod-wear. The debug port 100 performs data moves which are initiated by serial data port commands rather than processor instructions.

Operation of the processor core 104 from conventional pod-space is very similar to operating in DEBUG mode from a monitor program. All debug operations can be controlled via processor instructions. It makes no difference whether these instructions come from pod-space or regular memory. This enables an operating system to be extended to include additional debug capabilities.

Of course, via privileged system calls such a ptrace(), operating systems have long supported debuggers. However, the incorporation of an on-chip trace cache 200 now enables an operating system to offer software performance profiling and instruction trace capabilities. In a debug environment according to the present invention, it is possible to enhance an operating system to support limited trace without the incorporation of an "external" logic analyzer or in-circuit emulator.

Examples of instructions used to support internal loading and retrieving of trace cache 200 contents include a load instruction trace cache record command LITCR and a store instruction trace cache record command SITCR. The command LITCR loads an indexed record in the trace cache 200, as specified by a trace cache pointer ITREC.PTR, with the contents of the EAX register of the processor core 104. The trace cache pointer ITREC.PTR is pre-incremented, such that the general operation of the command LITCR is as follows:

$ITREC.PTR<-ITREC.PTR+1;$ $ITREC[ITREC.PTR]<-EAX.$

In the event that the instruction trace record (see description of trace record format below ) is smaller that the EAX record, only a portion of the EAX register is utilized.

Similarly, the store instruction trace cache record command SITCR is used to retrieve and store (in the EAX register) an indexed record from the trace cache 200. The contents of the ECX register of the processor core 104 are used as an offset that is added to the trace cache pointer ITREC.PTR to create an index into the trace cache 200. The ECX register is post-incremented while the trace cache pointer ITREC.PTR is unaffected, such that:

$EAX<-ITREC[ECX+ITREC.PTR];$ $ECX<-ECX+1.$

Numerous variations to the format of the LITCR and SITCR commands will be evident to those skilled art.

Extending an operating system to support on-chip trace has certain advantages within the communications industry. It enables the system I/O and communication activity to be maintained while a task is being traces. Traditionally, the use of an in-circuit emulator has necessitated that the processor be stopped before the processor's state and trace can be examined (unlike ptrace()). This disrupts continuous support of I/O data processing.

Additionally, the trace cache 200 is very useful when used with equipment in the field. If an unexpected system crash occurs, the trace cache 200 can be examined to observe the execution history leading up the crash event. When used in portable systems or other environments in which power consumption is a concern, the trace cache 200 can be disabled as necessary via power management circuitry.

EXEMPLARY TRACE RECORD FORMAT

In the disclosed embodiment of the invention, an instruction trace record is 20 bits wide and consists of two fields, TCODE (Trace Code) and TDATA (Trace Data), as well as a valid bit V. The TCODE field is a code that identifies the type of data in the TDATA field. The TDATA field contains software performance profile and other trace information used for debug purposes.

| 20 | 19 | 15 | 0 |
|---|---|---|---|
| V | TCODE (Trace Code) | TDATA (Trace Data) | |

Instruction Trace Record Format

In one contemplated embodiment of the invention, the embedded processor device 102 reports performance profiling data as well as data corresponding to ten other trace codes as set forth in the following table:

| TCODE # | TCODE Type | TDATA |
|---|---|---|
| 0000 | Missed Trace | Not Valid |
| 0001 | Conditional Branch | Contains Branch Sequence |
| 0010 | Branch Target | Contains Branch Target Address |
| 0011 | Previous Segment Base | Contains Previous Segment Base Address and Attributes |
| 0100 | Current Segment Base | Contains Current Segment Base Address and Attributes |
| 0101 | Interrupt | Contains Vector Number of Exception or Interrupt |

-continued

| TCODE # | TCODE Type | TDATA |
|---|---|---|
| 0110 | Trace Synchronization | Contains Address of Most Recently Executed Instruction |
| 0111 | Multiple Trace | Contains 2nd or 3rd Record of Entry With Multiple Records |
| 1000 | Trace Stop | Contains Instruction Address Where Trace Capture Was Stopped |
| 1001 | User Trace | Contains User Specified Trace Data |
| 1010 | Performance Profile | Contains Performance Profiling Data |

The trace cache 200 is of limited storage capacity; thus a certain amount of "compression" in captured trace data is desirable. In capturing trace data, the following discussion assumes that an image of the program being traced is available to the host system H. If an address can be obtained from a program image (Object Module), then it is not provided in the trace data. Preferably, only instructions which disrupt the instruction flow are reported; and further, only those where the target address is in some way data dependent. For example, such "disrupting" events include call instructions or unconditional branch instructions in which the target address is provided from a data register or other memory location such as a stack.

As indicated in the preceding table, other trace information that can be captured includes: the target address of a trap or interrupt handler; the target address of a return instruction; a conditional branch instruction having a target address which is data register dependent (otherwise, all that is needed is a 1-bit trace indicating if the branch was taken or not); and, most frequently, addresses from procedure returns. Other information, such as task identifiers and trace capture stop/start information, can also be placed in the trace cache 200. The precise contents and nature of the trace records are not considered critical to the invention.

Figure 6A:
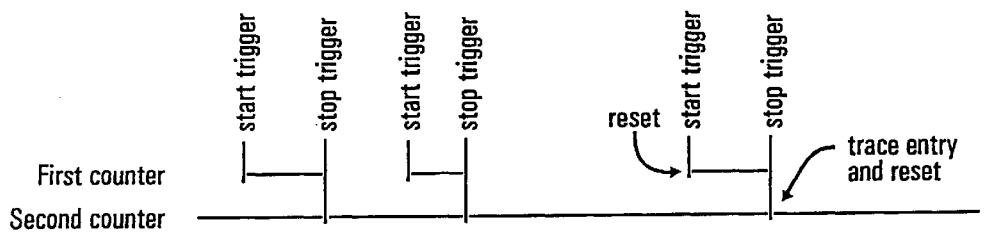
FIG. 6A illustrates performance profile counter sequences according to the present invention.

Referring now to FIG. 6A, exemplary performance profile counter sequences are illustrated. In a system according to the present invention, trigger control registers 219 are configured to start and stop a counter that measures lapsed time of execution for specified procedures. Although the precise implementation of the trigger control registers 219 is not considered critical to the invention, use of conventional breakpoint registers (such as any of the debug registers DR0–DR7 present in some prior microprocessor cores) to perform the triggering functions is preferred. Further, it should be noted that in the disclosed embodiment of the invention normal instruction execution is not interrupted while profiling information is gathered.

Figure 6B:
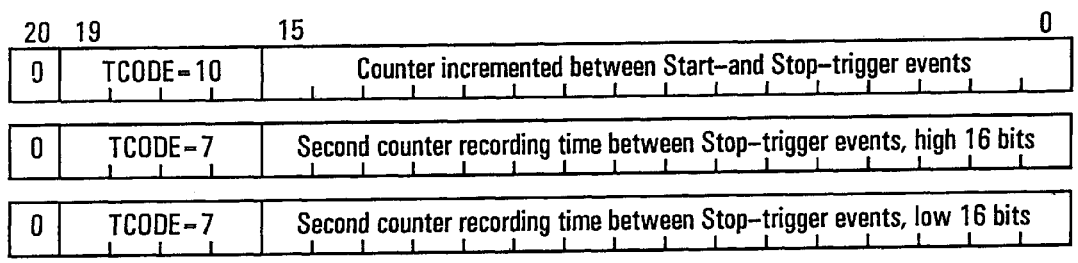
FIG. 6B illustrates the general format of a trace cache entry set for reporting software performance profiling information in accordance with the invention.

Referring more specifically to FIG. 6A, a first on-chip trigger control register 219a is configured to trigger (start) a first counter upon entry into a specified procedure. A second trigger control register 219b is used to stop the counter upon entry into the prologue of the specified procedure. When the first counter is started by the start trigger, it is initialized to zero. When the stop trigger is generated as specified by the second trigger control register 219b, the count value of the first counter is placed in the trace cache 200 using a TCODE=1010 trace entry (FIG. 6B). Similar techniques can be used to measure other parameters such as interrupt handler execution times. As described above, the trigger control registers 219 can also be used to pulse the trigger signal TRIG and to select program addresses where execution trace is to start and stop.

In the disclosed embodiment of the invention, a second counter is also used. The second counter runs continually, but is reset to zero following a stop trigger event. The stop trigger event also causes the value of the second counter to be placed in the trace cache 200. This second counter value is useful for obtaining the frequency of occurrence of a procedure of interest, whereas the first counter provides information about the procedure's execution time.

Referring to FIG. 6B, the general format of a trace cache 200 entry set for reporting software performance profiling information in accordance with the invention is shown. As shown, the count value of the first counter is placed in the trace cache 200 using a 16-bit value with a TCODE=1010 trace entry. This TCODE=1010 trace entry may be followed by a TCODE=0111 entry pair containing a 32-bit count value reflecting the value of the second counter.

In one embodiment of the invention, the counter frequency (i.e., resolution) of the first and second counters is programmable. Such programmability may allow for better accuracy when profiling very low frequency or high frequency events. For example, the following table depicts two alternate and programmable accumulation frequencies for the counters:

| Counter Frequency (@ 33 MHz bus speed) | Timing Resolution (4× clock scaling) | Maximum Counter Duration: 16-bit | Maximum Counter Duration: 32-bit |
|---|---|---|---|
| ½ bus speed | 60.6 ns/8 cycles | 4 ms | 260 seconds |
| ⅛ bus speed | 242 ns/32 cycles | 15.9 ms | 1,040 seconds |

When entering a privileged level ring zero or ring one, it is also sometimes desirable to stop all counting (both counters). This enables system calls and interrupts to be eliminated from the measured profiling values. Two further support features may also be incorporated, including a means of enabling/disabling counting and also simultaneously resetting both count values. This aspect of the disclosed embodiment invention aids with task context switching occurring during a procedure (within a single task) being monitored. Via a periodic interrupt handler, it is also possible to examine procedures one at a time.

Post-processing software, in conjunction with optional off-chip trace capture hardware, can be utilized to analyze the profile data. Thus, the trace cache 200 is utilized to gather information concerning the execution time spent in a selected procedure. Generally, only one procedure is profiled at a time. By examining the trace cache 200, the minimum average and maximum time spent in a procedure can be determined (within the limitations of the samples gathered). Code coverage profiling capabilities can also be added to show specific addresses executed and not executed during test runs. The trace cache 200 allows statistical analysis to be performed using as many samples as can be stored.

FIG. 7A illustrates an exemplary format for reporting conditional branch events. The outcome of up to 15 branch events can be grouped into a single trace entry. The 16-bit TDATA field (or "BFIELD") contains 1-bit branch outcome trace entries, and is labeled as a TCODE=0001 entry. The TDATA field is initially cleared except for the left-most bit, which is set to 1. As each new conditional branch is encountered, a new one bit entry is added on the left and any other entries are shifted to the right by one bit.

Using a 128 entry trace cache 200 allows 320 bytes of information to be stored. Assuming a branch frequency of one branch every six instructions, the disclosed trace cache 200 therefore provides an effective trace record of 1,536 instructions. This estimate does not take into account the occurrence of call, jump and return instructions.

The trace control logic 218 monitors instruction execution via processor interface logic 202. When a branch target address must be reported, information contained within a current conditional branch TDATA field is marked as complete by the trace control logic 218, even if 15 entries have not accumulated. As shown in FIG. 7B, the target address (in a processor-based device 102 using 32-bit addressing) is then recorded in a trace entry pair, with the first entry (TCODE=0010) providing the high 16-bits of the target address and the second entry (TCODE =0111) providing the low 16-bits of the target address. When a branch target address is provided for a conditional jump instruction, no 1-bit branch outcome trace entry appears for the reported branch.

STARTING AND STOPPING TRACE CAPTURE

Referring now to FIG. 7C, it may be desirable to start and stop trace gathering during certain sections of program execution; for example, when a task context switch occurs. When trace capture is stopped, no trace entries are entered into the trace cache 200, nor do any appear on the bond-out pins of the trace port 214. Different methods are contemplated for enabling and disabling trace capture. For example, an x86 command can be provided, or an existing x86 command can be utilized to toggle a bit in an I/O port location. Alternatively, on-chip trigger control registers 219 can be configured to indicate the addresses where trace capture should start/stop. When tracing is halted, a trace entry (TCODE=1000, TCODE=0111) recording the last trace address is placed in the trace stream. When tracing is resumed, a trace synchronization entry (TCODE=0110, TCODE=0111) containing the address of the currently executing instruction is generated.

It may be important to account for segment changes that occur while tracing is stopped. This situation can be partially resolved by selecting an option to immediately follow a TCODE=1000 entry with a current segment base address entry (TCODE=0100, TCODE=0111), as shown in FIG. 7C. A configuration option is also desirable to enable a current segment base address entry at the end of a trace prior to entering Debug mode. By contrast, it may not be desirable to provide segment base information when the base has not changed, such as when an interrupt has occurred.

Referring to FIG. 7D, following the occurrence of an asynchronous or synchronous event such as an interrupt or trap, a TCODE=0101 trace entry is generated to provide the address of the target interrupt handler. However, it is also desirable to record the address of the instruction which was interrupted by generating a trace synchronization (TCODE= 0110) entry immediately prior to the interrupt entry, as well as the previous segment base address (TCODE=0011). The trace synchronization entry contains the address of the last instruction retired before the interrupt handler commences.

SEGMENT CHANGES

FIG. 7E illustrates a trace entry used to report a change in segment parameters. When processing a trace stream, trace address values are combined with a segment base address to determine an instruction's linear address. The base address, as well as the default data operand size (32 or 16-bit mode), are subject to change. As a result, the TCODE=0011 and 0111 entries are configured to provide the information necessary to accurately reconstruct instruction flow. The TDATA field corresponding to a TCODE=0111 entry contains the high 16-bits of the previous segment base address, while the associated TCODE=0111 entry contains the low 15 or 4 bits (depending on whether the instruction is executed in real or protected mode). The TCODE=0111 entry also includes bits indicating the current segment size (32-bit or 16-bit), the operating mode (real or protected), and a bit indicating whether paging is being utilized. Segment information generally relates to the previous segment, not a current (target) segment. Current segment information is obtained by stopping and examining the state of the processor core 104.

USER SPECIFIED TRACE ENTRY

There are circumstances when an application program or operating system may wish to add additional information into a trace stream. For this to occur, an x86 instruction is preferably provided which enables a 16-bit data value to be placed in the trace stream at a desired execution position. The instruction can be implemented as a move to I/O space, with the operand being provided by memory or a register. When the processor core 104 executes this instruction, the user specified trace entry is captured by the trace control logic 218 and placed in the trace cache 200. As shown in FIG. 7F, a TCODE=1001 entry is used for this purpose in the disclosed embodiment of the invention. This entry might provide, for example, a previous or current task identifier when a task switch occurs in a multi-tasking operating system.

SYNCHRONIZATION OF TRACE DATA

When executing typical software on a processor-based device 102, few trace entries contain address values. Most entries are of the TCODE=0001 format, in which a single bit indicates the result of a conditional operation. When examining a trace stream, however, data can only be studied in relation to a known program address. For example, starting with the oldest entry in the trace cache 200, all entries until an address entry are of little use. Algorithm synchronization typically begins from a trace entry providing a target address.

If the trace cache 200 contains no entries providing an address, then trace analysis cannot occur. This situation is rare, but possible. For this reason, a synchronization register TSYNC is provided in the disclosed embodiment to control the injection of synchronizing address information. If the synchronization register TSYNC is set to zero, then trace synchronization entries are not generated.

| 6 | 0 |
|---|---|
| TSYNC (Trace Synchronization) | |

Trace Entry Synchronization Entry Control Register

FIG. 7G depicts a trace synchronization entry. In operation, a counter register is set to the value contained in the synchronization register TSYNC whenever a trace entry containing a target address is generated. The counter is decremented by one for all other trace entries. If the counter reaches zero, a trace entry is inserted (TCODE=0110) containing the address of the most recently retired instruction (or, alternatively, the pending instruction). In addition, when a synchronizing entry is recorded in the trace cache 200, it also appears on the trace pins 220 to ensure sufficient availability of synchronizing trace data for full-function ICE equipment.

Trace entry information can also be expanded to include data relating to code coverage or execution performance. This information is useful, for example, for code testing and performance tuning. Even without these enhancements, it is desirable to enable the processor core 104 to access the trace cache 200. In the case of a microconrroller device, this feature can be accomplished by mapping the the trace cache 200 within a portion of I/O or memory space. A more general approach involves including an instruction which supports moving trace cache 200 data into system memory.

Thus, a processor-based device providing a flexible, high-performance solution for furnishing software performance profiling information has been described. The processor-based device incorporates an trace cache capable of capturing and providing the profiling information. Both serial and parallel communication channels are provided for communicating the profiling information to external devices. The disclosed on-chip trace cache alleviates various of the bandwidth and clock synchronization problems that arise in many existing solutions, and also allows less expensive external capture hardware to be utilized when such hardware is employed.

The foregoing disclosure and description of the invention are illustrative and explanatory thereof, and various changes in the size, shape, materials components, circuit elements wiring connections and contacts, as well as in the details of the illustrated circuitry and construction and method of operation may be made without departing from the spirit of the invention.

What is claimed is:

1. An electronic processor-based device adapted to execute a series of software instructions, the processor-based device being provided with pins to permit connection to external conductors, the processor-based device comprising:
   a processor core; and
   a trace memory coupled to the processor core for storing software performance profiling information related to software instructions executed by the processor core, the trace memory comprising a series of storage elements, each storage element adapted to store software performance profiling information, the trace memory being configured to maintain the most recent information; and
   trace control circuitry to gather the software performance profiling information and to provide the software performance profiling information to the trace memory, the trace control circuitry comprising:
      a first software profile counter coupled to the trace memory;
      a first software profile trigger counter register coupled to the first software profile counter, the first software profile trigger control register configurable to activate the first software profile counter upon execution of a predetermined software instruction(s); and
      a second software profile trigger control register coupled to a first software profile counter, the second software profile trigger control register configurable to deactivate the first software profile counter upon execution of an additional predetermined software instruction(s),
      wherein deactivation of the first software profile counter causes its count value to be stored in the trace memory.

2. The processor-based device of claim 1, the trace control circuitry further comprising:
   a second software profile counter coupled to the trace memory,
   the second software profile trigger control register further configurable to initialize the second software profile counter upon execution of the additional predetermined software instruction(s), wherein initialization of the second software profile counter causes its count value immediately prior to initialization to be stored in the trace memory.

3. The processor-based device of claim 1, wherein the predetermined software instruction(s) indicates entry into a specified software procedure, and wherein the additional predetermined software instruction(s) indicates an exit from a specified software procedure.

4. The processor-based device of claim 1, wherein the predetermined software instruction(s) indicates entry into a specified interrupt handler, and wherein the additional predetermined software instruction(s) indicates an exit from the specified interrupt handler.

5. The processor-based device of claim 1, wherein the incrementation frequency of the first counter is programmable between at least two values.

6. The processor-based device of claim 1, wherein the trace memory is a first-in, first-out (FIFO) circular buffer.

7. The processor-based device of claim 1, further comprising:
   a communication channel connected between the trace memory and selected ones of the pins to provide for transmission of software performance profiling information from the trace memory to external devices.

8. The processor-based device of claim 7, wherein the communication channel comprises a parallel interface between the trace cache and selected ones of the pins.

9. The processor-based device of claim 7, wherein the communication channel comprises a serial interface between the trace memory and selected ones of the pins.

10. The processor-based device of claim 9, wherein the serial interface is essentially compliant with a serial interface standard.

11. The processor-based device of claim 10, wherein the serial interface is essentially compliant with an the IEEE-1149.1-1990 JTAG interface standard.

12. A method for providing software performance profiling information with a processor-based device having a processor core that is executing a series of software instructions, comprising the steps of:
   providing a trace memory within the processor-based device, the trace memory comprising a series of storage elements adapted to store software performance profiling information, the trace memory being configured to maintain the most recent information;
   generating software performance profiling information related to software instructions executed by the processor core, the generating step comprising the steps of:
      providing a software profile counter;
      activating the software profile counter upon execution of a software predetermined instruction(s);
      deactivating the software profile counter upon execution of an additional predetermined software instruction(s), the software performance profiling information comprising the count value of the software profile counter following its deactivation; and
   storing the software performance profiling information in the trace memory storage elements.

13. The method of claim 12, wherein the predetermined software instruction(s) indicates entry into a specified software procedure, and wherein the additional predetermined software instruction(s) indicates an exit from a specified software procedure.

14. The method of claim 12, wherein the predetermined software instruction(s) indicates entry into a specified interrupt handler, and wherein the additional predetermined software instruction(s) indicates an exit from the specified interrupt handler.

15. The method of claim 12, wherein the incrementation frequency of the first software profile counter is programmable between at least two values.

16. The method of claim 12, wherein the generating step comprises:

providing a software profile counter; and retrieving the count value of the software profile counter upon execution of a predetermined software instruction(s), the software performance profiling information comprising the retrieved count value.

17. The method of claim 16, further comprising the step of initializing the software profile counter and repeating the step of retrieving the count value to generate additional software performance profiling information.

18. The method of claim 12, further comprising the steps of:

providing a communication channel from the trace memory to the debug system;

communicating the software performance profiling information from the trace memory to the debug system via the communication channel.

19. The method of claim 18, wherein the communication channel utilized in the communication step is a serial interface.

20. The method of claim 18, wherein the communication channel utilized in the communication step is a parallel interface.

21. A software development environment for generating and analyzing software performance profiling information, comprising:

an electronic processor-based device adapted to execute a series of software instructions the processor-based device comprising:

pins for connecting to external conductors;

a processor core;

a trace memory coupled to the processor core for storing software performance profiling information related to software instructions executed by the processor core, the trace memory comprising a series of storage elements, the storage elements adapted to store software performance profiling information, the trace memory being configured to maintain the most recent information; and trace control circuitry to gather the software performance profiling information and to provide the software performance profiling information to the trace memory, the trace control circuitry comprising:

a first software profile counter coupled to the trace memory;

a first software profile trigger counter register coupled to the first software profile counter, the first software profile trigger control register configurable to activate the first software profile counter upon execution of a predetermined software instruction(s); and a second software profile trigger control register coupled to a first software profile counter, the second software profile trigger control register configurable to deactivate the first software profile counter upon execution of an additional predetermined software instruction(s), wherein deactivation of the first software profile counter causes its count value to be stored in the trace memory; and a host system communicatively coupled to the pins of the processor-based device for receiving software performance profiling information from the trace memory, the host system including software for analyzing the software performance profile information.

* * * * *

UNITED STATES PATENT AND TRADEMARK OFFICE
CERTIFICATE OF CORRECTION

PATENT NO. : 6,154,857
DATED : November 28, 2000
INVENTOR(S) : Daniel Peter Mann It is certified that error appears in the above-identified patent and that said Letters Patent is hereby corrected as shown below:

Column 18,
Line 46, "with" should be replaced by -- within --.

Signed and Sealed this

Twenty-first Day of June, 2005

JON W. DUDAS
*Director of the United States Patent and Trademark Office*